(12) United States Patent
Sugikami et al.

(10) Patent No.: US 12,716,766 B2
(45) Date of Patent: Aug. 25, 2026

(54) SHOPPING CART WITH FUNCTIONS TO DETECT COMMODITIES PLACED THEREIN

(71) Applicant: Toshiba Tec Kabushiki Kaisha, Tokyo (JP)

(72) Inventors: Reiji Sugikami, Yokohama (JP); Hachirou Sawada, Yokohama (JP); Katsuya Takeda, Yokohama (JP); Masahiro Yasuno, Yokohama (JP); Katsuaki Sakurada, Yokohama (JP); Teruo Suzuki, Yokohama (JP); Tomonori Sugiyama, Yokohama (JP); Hiroki Takeda, Saitama (JP); Fumio Nakatsukasa, Yokohama (JP); Yuna Otani, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 374 days.

(21) Appl. No.: 18/528,669

(22) Filed: Dec. 4, 2023

(65) Prior Publication Data

US 2024/0183703 A1 Jun. 6, 2024

(30) Foreign Application Priority Data

Dec. 6, 2022 (JP) ................................ 2022-194901

(51) Int. Cl.
*G01G 19/08* (2006.01)
*B62B 3/14* (2006.01)
*G01G 3/14* (2006.01)

(52) U.S. Cl.
CPC ............... *G01G 19/08* (2013.01); *B62B 3/14* (2013.01); *G01G 3/14* (2013.01)

(58) Field of Classification Search
CPC ...... G01G 19/08; G01G 3/14; B62B 2203/50; B62B 3/14
See application file for complete search history.

(56) References Cited

U.S. PATENT DOCUMENTS 4,725,822 A * 2/1988 Hooley ............. G08B 13/1481 340/568.5
5,488,202 A * 1/1996 Baitz .................... G07G 1/0072 177/25.15

(Continued)

FOREIGN PATENT DOCUMENTS

CN 206336317 U * 7/2017
DE 102018132059 A1 * 6/2020 ............ G07G 1/009

(Continued)

OTHER PUBLICATIONS

Machine translation of DE-102018132059-A1 (Year: 2018).*
U.S. Appl. No. 18/447,250, filed Aug. 9, 2023.
U.S. Appl. No. 18/465,107, filed Sep. 11, 2023.

*Primary Examiner* — Natalie Huls
(74) *Attorney, Agent, or Firm* — Kim & Stewart LLP

(57) ABSTRACT

Provided is a shopping cart capable of dealing with registration processing or payment processing when purchasing a lot of commodities. A shopping cart includes a cart body; an electronic device attached to the cart body and configured to perform at least one of registration processing and payment processing of commodities; an upper placing portion provided in an upper stage of the cart body and having the commodities placed thereon; a lower placing portion provided in a lower stage of the cart body and having the commodities placed thereon; and a detection device configured to detect presence of the commodities placed on the upper placing portion and the lower placing portion.

7 Claims, 6 Drawing Sheets

(56) References Cited

U.S. PATENT DOCUMENTS 5,814,968 A 9/1998 Lovegreen
6,997,382 B1 2/2006 Bhri
7,660,747 B2 2/2010 Brice
9,254,856 B2 2/2016 Oachs
10,086,859 B2 10/2018 Chen
10,266,196 B1 * 4/2019 Sinha ..................... B62B 3/008
10,759,459 B2 9/2020 Kurata
10,769,713 B1 * 9/2020 Townsend .......... G06Q 30/0635
11,155,290 B2 10/2021 Yokoyama
11,167,780 B2 11/2021 Yokoyama
11,299,188 B2 4/2022 Yokoyama
11,430,044 B1 8/2022 Maron
11,780,486 B2 10/2023 Ogishima
12,536,519 B2 * 1/2026 Gao ..................... G06Q 20/208
2006/0007191 A1 1/2006 Chi
2008/0088444 A1 * 4/2008 Rosebush ............. B62B 3/1488 340/568.5
2009/0228363 A1 * 9/2009 Segev ..................... A47F 9/047 705/16
2012/0296751 A1 * 11/2012 Napper ................ G06Q 20/208 705/23
2015/0206121 A1 * 7/2015 Joseph ................. G07G 1/0072 705/26.8
2015/0210306 A1 7/2015 Oachs
2017/0158215 A1 * 6/2017 Phillips ................. B62B 5/0096
2017/0305450 A1 10/2017 Chen
2018/0260799 A1 * 9/2018 Doerr ..................... G06K 7/087
2018/0370554 A1 * 12/2018 Raza ..................... B62B 3/1404
2019/0073656 A1 3/2019 Joseph
2019/0272400 A1 9/2019 Naito et al.
2020/0127505 A1 4/2020 Kato
2020/0172140 A1 6/2020 Yokoyama
2020/0254895 A1 8/2020 Kim
2021/0001741 A1 1/2021 Miyoshi
2021/0090052 A1 3/2021 Maita
2021/0117950 A1 * 4/2021 Bentsur .................. G01G 19/08
2021/0403065 A1 12/2021 Sa
2022/0405729 A1 12/2022 Soh
2023/0016155 A1 1/2023 Hiramatsu
2023/0035629 A1 2/2023 Naito
2023/0070487 A1 3/2023 Ogishima
2023/0147385 A1 * 5/2023 Hagen .................. G06Q 20/208 705/23
2024/0013185 A1 * 1/2024 Gao ....................... G06V 10/25
2024/0034381 A1 2/2024 Gao
2024/0212024 A1 * 6/2024 Becker ............... G06Q 30/0641
2025/0102348 A1 * 3/2025 Tzuberi ................. B62B 3/1424
2025/0140084 A1 * 5/2025 Kawabe ............... G07G 1/0045
2025/0232280 A1 * 7/2025 Gyure .................. G07G 1/0072
2025/0232360 A1 * 7/2025 K.Rajappan ......... G06Q 20/208

FOREIGN PATENT DOCUMENTS

EP 3517353 A1 7/2019
JP 2006-101577 A 4/2006
JP 2019-153064 A 9/2019
JP 2020-066310 A 4/2020
JP 2022-032815 A 2/2022
WO 01/36248 A1 5/2001
WO 2018/231184 A1 12/2018

* cited by examiner

SHOPPING CART WITH FUNCTIONS TO DETECT COMMODITIES PLACED THEREIN

CROSS-REFERENCE TO RELATED APPLICATION

This application is based upon and claims the benefit of priority from Japanese Patent Application No. 2022-194901, filed Dec. 6, 2022, the entire contents of which are incorporated herein by reference.

FIELD

Embodiments relates to a shopping cart, for example, a shopping cart mainly used in a store such as a supermarket or a shopping mall.

BACKGROUND

Conventionally, in a store such as a supermarket or a shopping mall, payment is processed by a store clerk or a customer at a cash register provided in the store. Thus, for example, during busy hours, etc., customers waiting for payments are concentrated at the cash register, which not only makes the customers wait for a long time, but also places a heavy workload on the clerk performing commodity registration processing for registering a commodity or payment processing for payment of a registered commodity.

Therefore, a system has been proposed in which payment processing can be performed without going to the cash register by being equipped with electronic devices such as a reading device capable of reading commodity information and a display device capable of displaying payment information, etc. in a shopping cart, and a battery that supplies power to these electronic devices, and reading commodity information on the spot when a customer selects the commodity.

The shopping cart used in this type of system includes a reading device for reading commodity information and a detection device installed in a placing portion of the commodity. When the reading device reads barcode, etc. attached to the commodity, the shopping cart acquires information such as a price of the same commodity from a database. Then, when the detection device detects that an item is placed in the placing portion, quantity of the item is added to total quantity of commodities placed in the placing portion to prevent reading errors or forgetting to read by a user, so that commodity payment processing can be accurately performed.

The shopping cart described above has a detection device only in an upper placing portion and cannot weigh a commodity placed in a lower placing portion. Therefore, the lower placing portion cannot be used as a place for commodities subjected to payment processing on the shopping cart, and cannot deal with the case of registering or paying for a lot of commodities at once.

The embodiments have been made in view of the above problem, and an object of the embodiments is to provide a shopping cart capable of dealing with registration processing or payment processing when purchasing a lot of commodities.

DESCRIPTION OF THE PREFERRED EMBODIMENTS

Modes for carrying out a shopping cart will be described below on the basis of embodiments.

Embodiments

A shopping cart according to an embodiment will be described below with reference to FIGS. 1 to 6. Note that, in the following description, a diagonally lower left of FIG. 1 is set as a front of the shopping cart, and upper, lower, right, and left directions when viewing the shopping cart from the front side are used as the reference.

Figure 1:
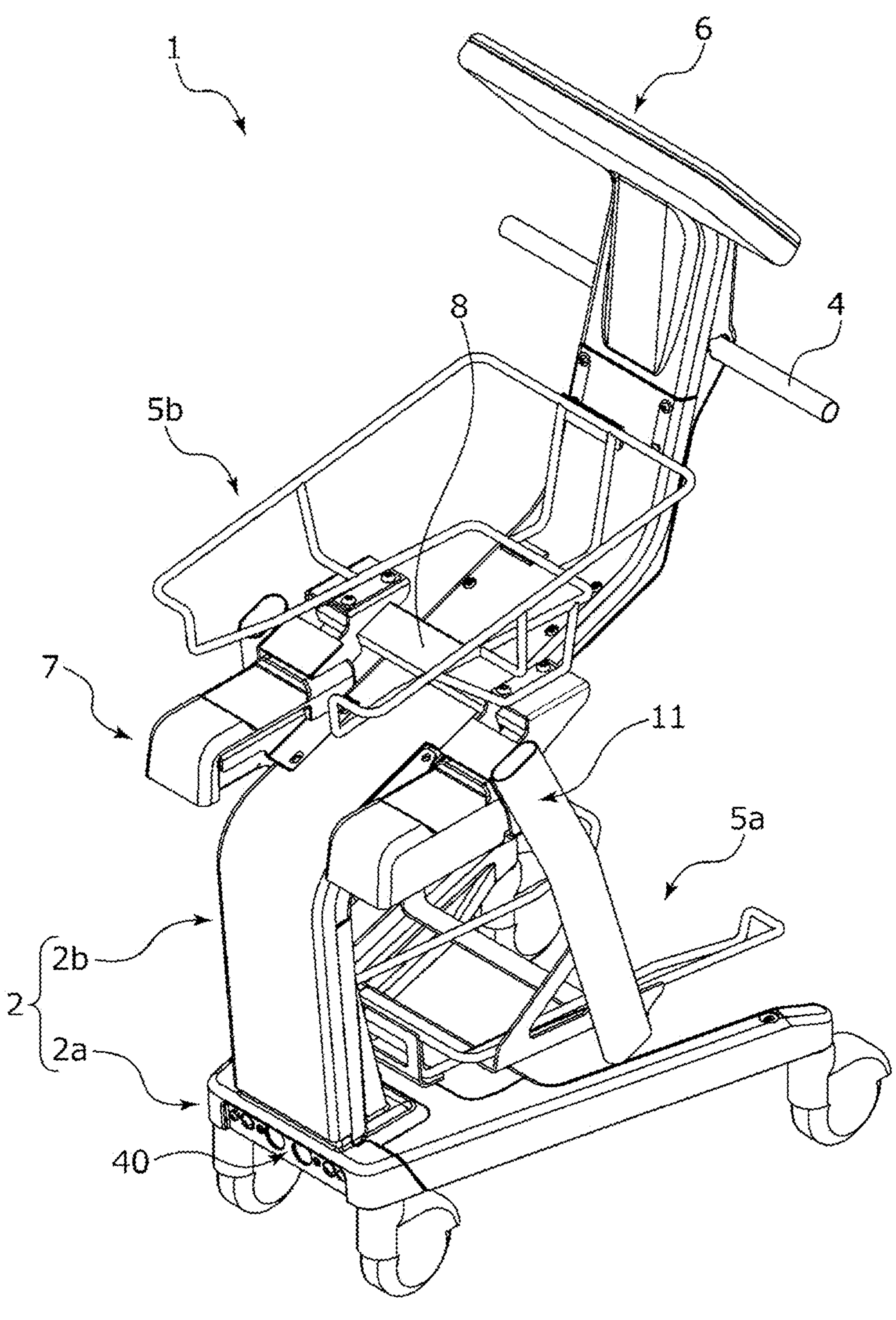
FIG. 1 is a perspective view of a shopping cart when viewed from a front side in an embodiment.
Figure 2:
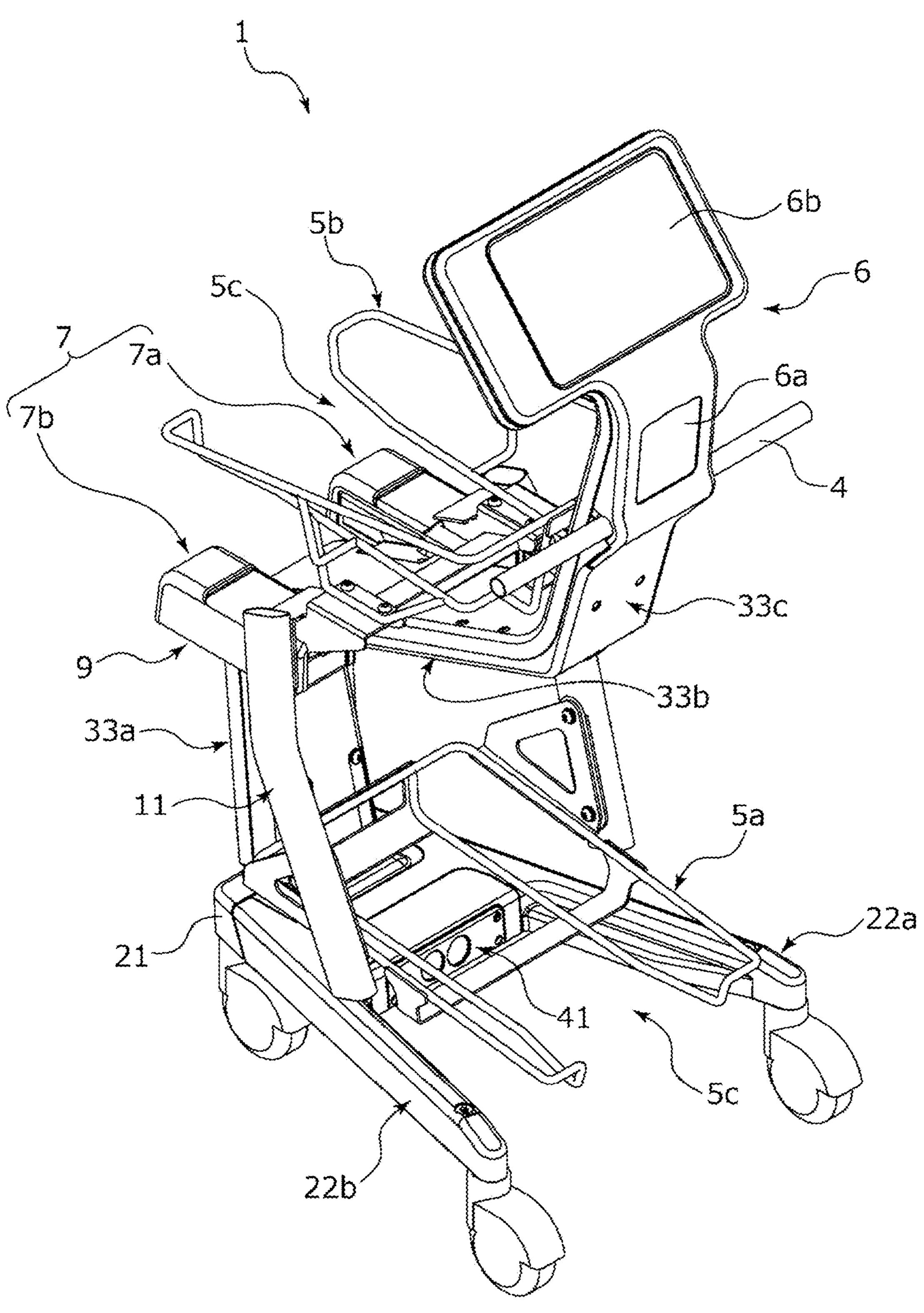
FIG. 2 is a perspective view of the shopping cart when viewed from a rear side.

As illustrated in FIGS. 1 and 2, for example, the shopping cart 1 (hereinafter abbreviated as a cart) is a cart used by customers to a supermarket, a shopping mall, etc. The cart 1 mainly includes a cart body 2, a plurality of (for example, four) casters 3 provided on a lower part of the cart body 2, a handle 4 operated by a user, two upper and lower placing portions 5*a* and 5*b* on which baskets (not illustrated) capable of holding commodities can be placed, an electronic device 6 used for registration processing for registering a target commodity purchased by the user or payment processing of the commodity registered by this registration processing, a battery capable of supplying power to the electronic device 6, a power receiving portion 40 for receiving power, and a power transmitting portion 41 for transmitting power, and can be nested in a front-rear direction as described later.

The cart body 2 mainly includes a lower body part 2*a* having a substantially bifurcated shape in a plan view disposed along a floor surface, and a plate-shaped upper body part 2*b* erected on a front end side of the lower body part 2*a*. The casters 3 are attached to front and rear ends of a lower part of the lower body part 2*a*, so that movement on the floor surface is allowed.

The power receiving portion 40 is provided on a front surface of a base 21 on a root side of the lower body part 2*a*, a power transmitting portion 41 is provided on a rear surface of the base 21, power supplied to the power receiving portion 40 can be supplied to a battery (not illustrated) and the power transmitting portion 41, and power can be supplied to a power receiving portion 40 of another cart 1 nested and connected to the own power transmitting portion 41. Side frames 22*a* and 22*b* forming a bifurcated shape of the lower body part 2*a* are spaced apart from each other to the right and left, and are arranged in a substantially V-shape in a plan view such that a distance therebetween gradually increases toward the rear side.

The battery is electrically connected to each of the electronic device 6, the power receiving portion 40 and the power transmitting portion 41, and a sensor 10 of a detection device 7, which will be described later, by a wire to supply power thereto. This wire is accommodated in a space covered by the cover member 32 of the upper body part 2*b* of the cart body 2, although not illustrated in detail.

The upper body part 2b is configured in a plate shape having two frame members (not illustrated) erected and separated from each other to the right and left on the base 21 on the root side, and a cylindrical cover member 32 provided to cover the outside of the frame members, and has a first frame 33a extending forward and upward from an upper surface of the base 21, a second frame 33b extending rearward and upward from an upper end of the first frame 33a, and a third frame 33c extending rearward and upward from an upper end of the second frame 33b. A battery (not illustrated) is incorporated in the upper body part 2b.

Further, the lower placing portion 5a arranged on the rear side of the first frame 33a and below the second frame 33b and the upper placing portion 5b arranged on the front side of the third frame 33c and above the second frame 33b are each formed into a box shape having a top opened by bending a linear member.

The lower placing portion Sa is inclined downward toward the rear, and the second frame 33b is inclined upward toward the rear. In this way, a vertical distance between the second frame 33b and the lower body part 2a increases toward the rear side, so that a customer can easily put a commodity into a basket (not illustrated) placed on the placing portion 5a from the rear side of the cart 1.

In the present embodiment, a reading device 6a such as a reader for reading information of a commodity selected by the user of the cart 1 and an information terminal 6b that displays commodity information read by the reading device 6a and enables various operations are provided as the electronic device 6. Note that other devices than the above-mentioned devices used for registration processing, payment processing, or registration processing and payment processing of the commodity selected by the customer may be provided.

The upper placing portion 5b and the lower placing portion 5a are attached to the second frame 33b via the detection device 7. Specifically, the detection device 7 is configured by coupling a first detection device 7a and a second detection device 7b, which are bisymmetrically arranged on the right and left sides, at upper ends thereof by a connecting rod 8.

Next, the second detection device 7b will be described using FIGS. 1 to 5. Note that, due to the bisymmetrical shape, a detailed description of a configuration of the first detection device 7a is omitted. The second detection device 7b mainly includes a load receiver body 9 having the sensor 10, which will be described later, and a suspension portion 11 extending downward from the load receiver body 9.

Figure 4:
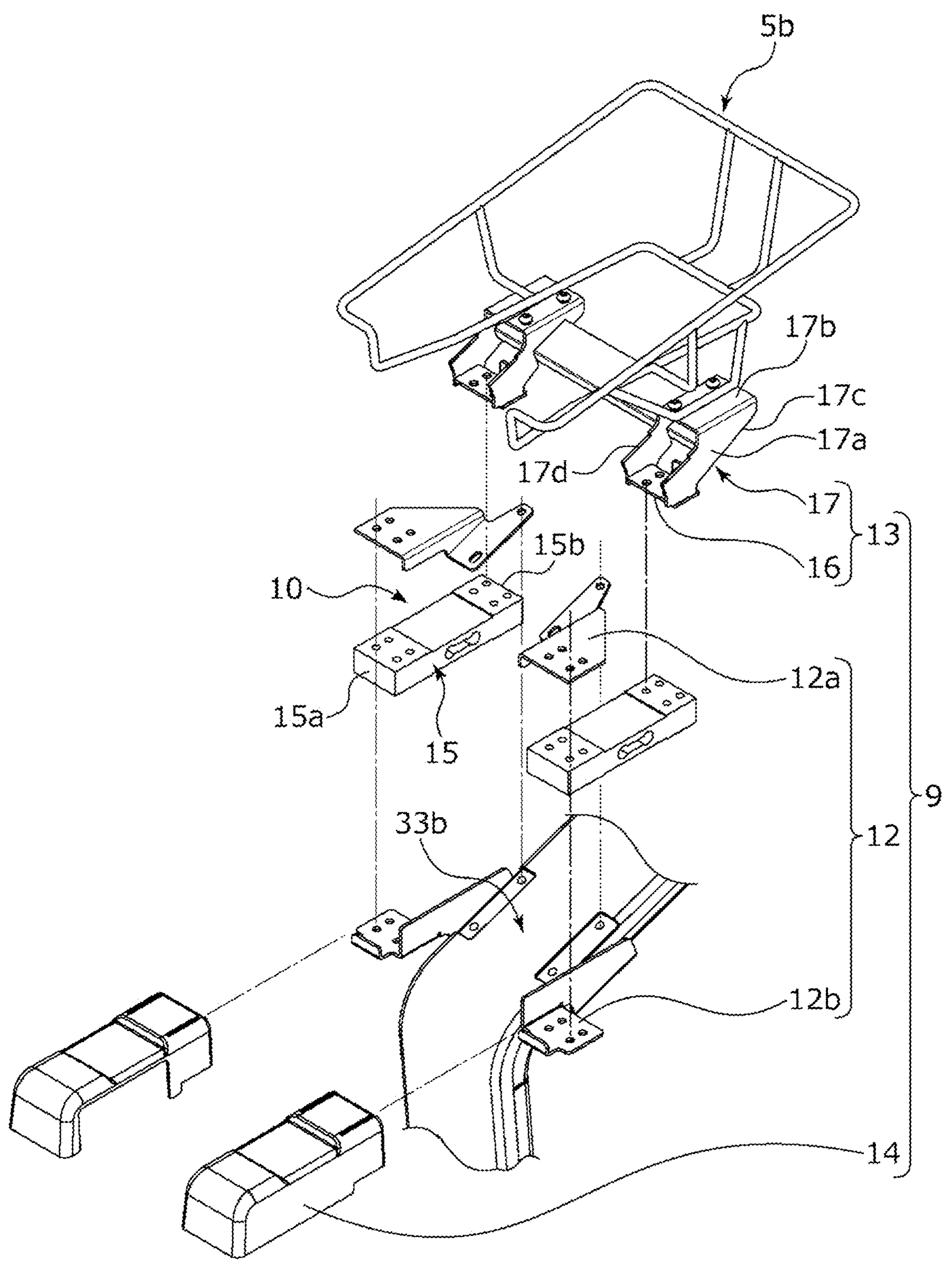
FIG. 4 is an exploded perspective view illustrating a load receiver body in a detection device.

As illustrated in FIG. 4, the load receiver body 9 mainly includes the sensor 10, a connection base 12 connecting the sensor 10 and the second frame 33b to each other, a support base 13 connecting the upper placing portion 5b to the sensor 10, and a cover member 14 for covering the connection base 12.

The sensor 10 is a load sensor that includes a strain body 15 arranged to have a longitudinal length in the front-rear direction of the cart body 2 and a strain gauge (not illustrated) attached to the strain body 15. The strain body 15 is fixed to the second frame 33b by the connection base 12 at a front end 15a.

As illustrated in FIG. 4, the connection base 12 includes an upper member 12a and a lower member 12b each formed by bending a metal plate. Front end sides of the upper member 12a and the lower member 12b are fixed to an upper surface and a lower surface of the front end 15a of the strain body 15, respectively, and rear end sides of the upper member 12a and the lower member 12b are fixed to an upper surface and a lower surface of the second frame 33b, respectively.

The support base 13 has a fixed plate 16 fixed to an upper surface of the rear end 15b of the strain body 15, and a connection portion 17 fixed above the fixed plate 16 and connected to the upper placing portion 5b.

The connection portion 17 has a downward U shape in a front view, and has right and left side plates 17a each welded and fixed to the fixed plate 16 at a lower front end thereof. A wire frame included in the upper placing portion 5b is fixed to an upper plate 17b. In addition, each of the side plates 17a of the connection portion 17 extends so that the upper plate 17b, which is an upper end of the connection portion 17, is positioned behind the fixed plate 16, a lower part on the rear side of the side plate 17a is an inclined portion 17c (see FIG. 3) inclined downward from the rear to the front, and a space below the upper plate 17b is ensured. In addition, a front-side upper portion of the side plate 17a is an inclined portion 17d substantially parallel to the inclined portion 17c, and a space above the fixed plate 16 is ensured.

Figure 5:
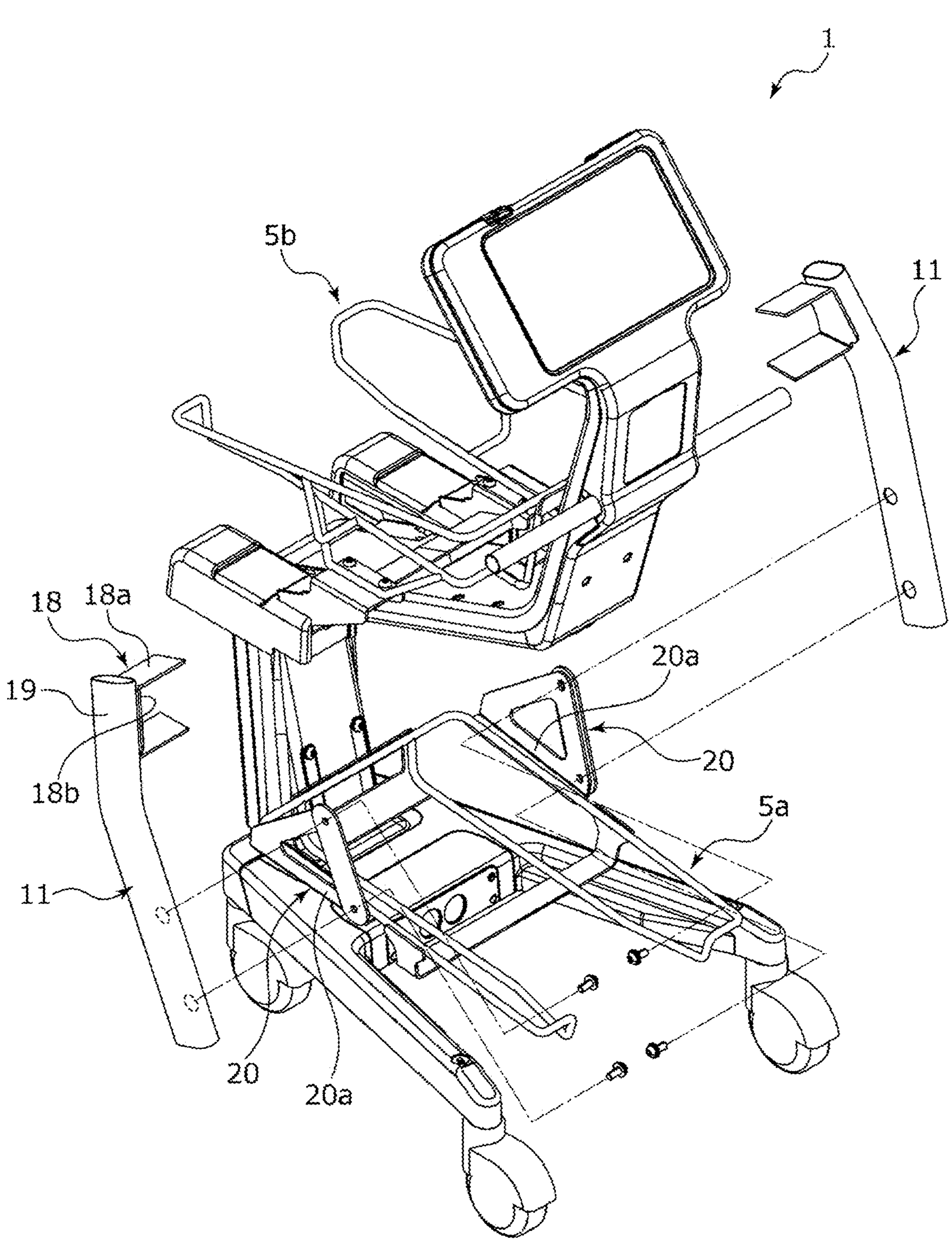
FIG. 5 is an exploded perspective view illustrating a suspension portion in the detection device.

As illustrated in FIG. 5, the suspension portion 11 has an inward U-shaped connection portion 18 in a front view and a tubular frame 19 whose upper end is fixed to the connection portion 18 and extends downward. The connection portion 18 has an upper surface 18a welded and fixed to the inclined portion 17d of the connection portion 17 (see FIG. 4).

An upper end of the suspension portion 11 is fixed to the side plate 18b of the connection portion 18. A lower connection member is connected to a lower end of suspension portion 11. The lower connection member 20 is made of a metal plate having a triangular outer shape in a side view and having a triangular through hole inside, a part of a lower end 20a included in a base of the triangle is folded inward, and a wire frame included in the lower placing portion Sa is fixed thereto.

As described above, the upper placing portion 5b is supported above the second frame 33b while being separated therefrom via the load receiver body 9, and the lower placing portion 5a is suspended from the second frame 33b above the lower body part 2a of the cart body 2 while being separated therefrom by the load receiver body 9 and the suspension portion 11.

The strain body 15 included in the sensor 10 is an elastically deformable thick plate-shaped metal member, and is arranged to have a longitudinal length in the front-rear direction of the cart body 2 (see FIG. 4). Further, the strain gauge (not illustrated) is attached to approximately a center of the strain body 15, and when the strain body 15 is elastically deformed, a resistance value of the strain gauge attached to the strain body 15 changes. The strain gauge is connected to the information terminal 6b by a wire (not illustrated), and the resistance value is transmitted to the information terminal 6b as detection information.

Both the upper placing portion 5b and the lower placing portion 5a have a mode in which a load is applied to the rear end 15b of the strain body 15, and when commodities are placed directly on the placing portion 5b or the placing portion 5a, or when commodities are put into a basket (not illustrated) placed on the placing portion 5b and the placing portion 5a, the strain body 15 is elastically deformed by the weight of the commodities, more specifically, the cantilever-like strain body 15 having the front end 15a as a base point is elastically deformed. On the other hand, when the commodities are taken out from the placing portion 5b or the placing portion 5*a*, the strain body 15 elastically recovers due to the weight reduction of the commodities, and the resistance value changes.

When the load of the commodity is applied to either the upper placing portion 5*b* or the lower placing portion 5*a*, or the load of the commodity is removed, in the detection device 7, resistance values of both the strain gauge of the first detection device 7*a* and the strain gauge of the second detection device 7*b*, which are arranged on the right and left respectively, change, and the resistance values of both the strain gauges are transmitted to the information terminal 6*b*. The information terminal 6*b* uses the changes in the resistance values received from both the strain gauges to detect a change in the presence of the commodity in either the upper placing portion 5*b* or the lower placing portion 5*a*.

When the reading device 6*a* reads information of the commodity by the user, the information terminal 6*b* starts registration processing of the commodity and performs processing of monitoring a change of the resistance value received from the strain gauge. Then, when the change of the resistance value received from the strain gauge, here, an increase in load can be detected, registration processing of the commodity is completed. Conversely, when an increase in load cannot be detected, registration processing of the commodity is interrupted and an error is displayed. In this way, the information terminal 6*b* performs various arithmetic processing using the resistance values received from the strain gauges, and thus may be regarded as being included a part of the detection device 7.

As described above, the cart body 2 of the shopping cart 1 according to the embodiment includes the detection device 7 capable of integrally detecting the presence of commodities placed on the upper placing portion 5*b* and the lower placing portion 5*a*. Therefore, the detection device 7 can detect the presence of the commodities placed on either the upper placing portion 5*b* or the lower placing portion 5*a*, and thus by effectively utilizing both the upper placing portion 5*b* and the lower placing portion 5*a*, it is possible to deal with registration processing or payment processing when purchasing a lot of commodities.

In addition, the detection device 7 can integrally detect the presence of the commodities placed on the upper placing portion 5*b* and the lower placing portion 5*a* with a simple structure using the sensor 10 using the strain gauges.

In addition, one end of the strain body 15 in a longitudinal direction is connected to the second frame 33*b* of the cart body 2, the other end thereof is connected to the load receiver body 9 fixed to a lower part of the upper placing portion 5*b*, and the lower placing portion 5*a* is suspended by the suspension portion 11 extending downward from the load receiver body 9. In this way, the loads of the upper placing portion 5*b* and the lower placing portion 5*a* are directly applied to the strain bodies 15 included in the sensor 10 via the load receiver body 9 and the suspension portion 11, and it is possible to integrally detect the presence of the commodities placed on the upper placing portion 5*b* and the lower placing portion 5*a* with a simple structure.

In addition, since the lower placing portion 5*a* is arranged to be opened rearward with respect to the cart body 2, the commodity read by the reading device 6*a* arranged behind the cart body 2, that is, on the customer side, can be easily put into the lower placing portion 5*a* from the customer side.

Figure 6:
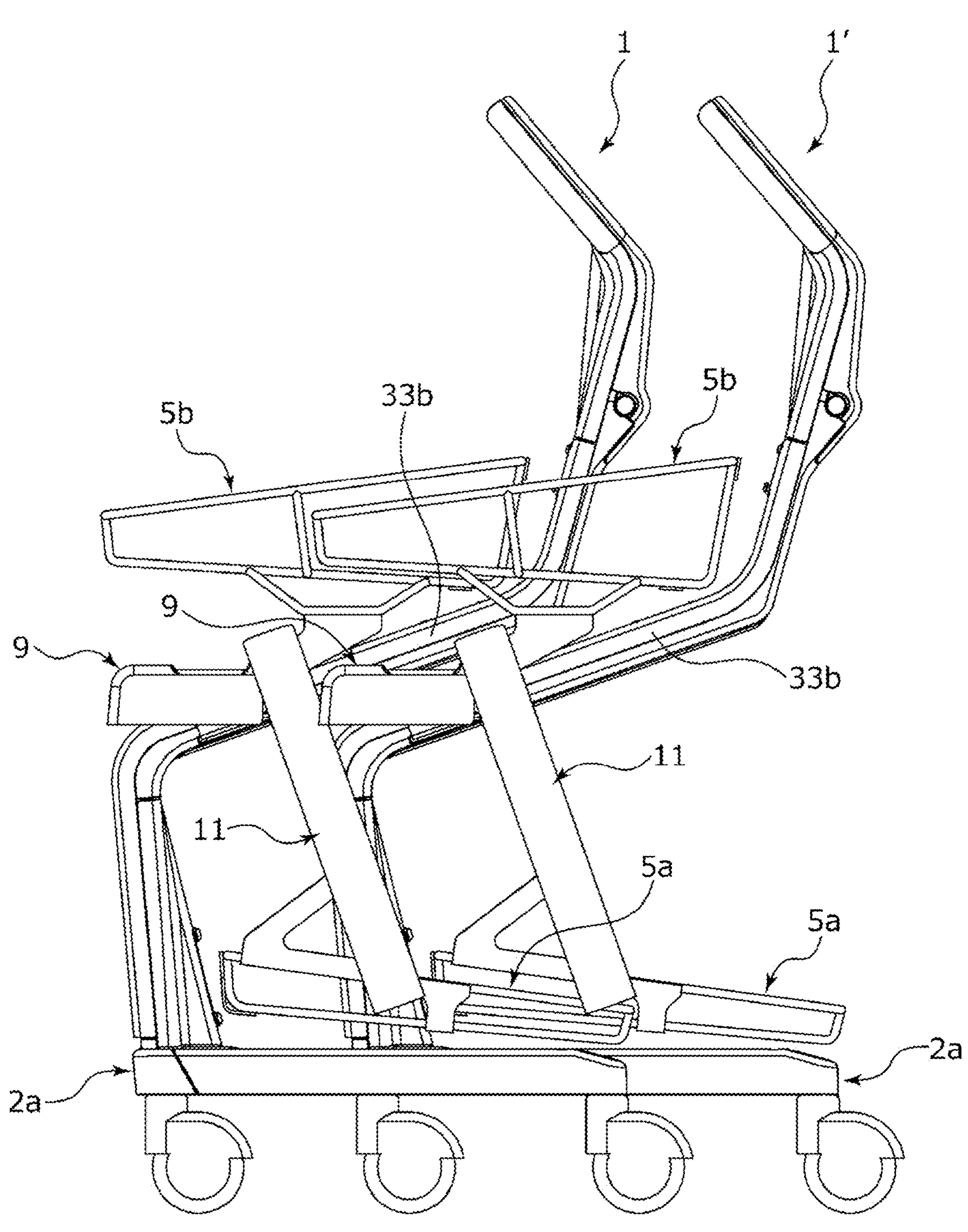
FIG. 6 is a side view illustrating a state in which shopping carts are nested one behind the other.

A plurality of carts 1 can be stored in, for example, a cart storage area installed at a predetermined position in a store. Then, in the cart storage area, etc., carts 1 and 1' can be nested in the front-rear direction as illustrated in FIG. 6.

Although not illustrated in detail in the figure, the lower body part 2*a* of the following cart 1' enters a substantially trapezoidal space in a plan view opened to the rear side formed between the right and left side frames 22*a* and 22*b* of the lower body part 2*a* of the cart 1 on the front side opened in a V-shape. At this time, subsequent side frames 22*a* and 22*b* are guided by the inner surfaces of the front side frames 22*a* and 22*b*, so that right and left positions of the nested front and rear carts 1 and 1' are positioned relative to each other.

As illustrated in FIGS. 1 and 2, a receiving portion 5*c* capable of receiving the upper body part 2*b* of another cart 1 extends in the front-rear direction at a central position of each of the placing portions 5*a* and 5*b* in the right-left direction. The electronic device 6 and the detection device 7 are electrically connected to the battery, and power is supplied thereto from the battery. In addition, the power receiving portion 40, the power transmitting portion 41, and the battery are electrically connected by an electric circuit (not illustrated), and power supplied to the power receiving portion 40 can be supplied to the battery and the power transmitting portion. Then, for example, depending on the situation such as the remaining amount of the battery, the battery can be charged with power supplied to the power receiving portion 40, or power can be supplied (transmitted) to the power receiving portion 40 of another cart 1 nested in the front-rear direction via the power transmitting portion 41.

Figure 3:
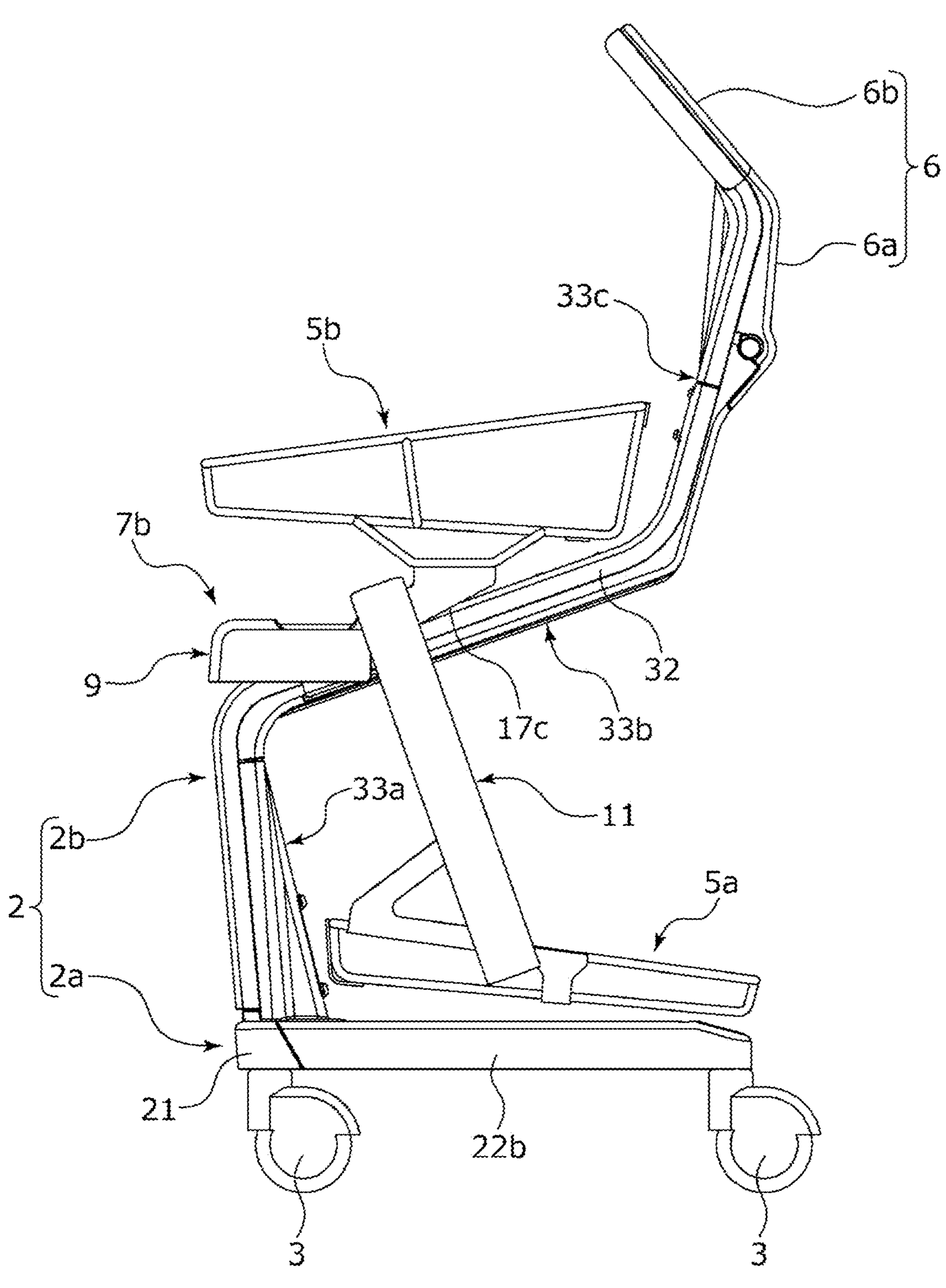
FIG. 3 is a side view illustrating the shopping cart.

As illustrated in FIGS. 1 to 3, the strain body 15 has a longitudinal length in the front-rear direction of the cart body 2, the front end 15*a* is connected to the cart body 2, and the load receiver body 9 is connected to the rear end 15*b*. In this way, since the strain body 15 does not protrude to the right and left sides of the cart body 2, the detection device 7 can be compactly configured, and when the carts 1 and 1' are nested in the front-rear direction, the strain body 15 of the following cart 1' can be inserted below the load receiver body 9, and the detection device 7 is less likely to affect nesting of the carts 1 and 1'. In other words, the carts 1 and 1' can be nested close to each other, and a plurality of carts 1 can be compactly stored.

Further, the detection device 7 includes the first detection device 7*a* and the second detection device 7*b* arranged on the right and left sides of the second frame 33*b* of the cart body 2, respectively. That is, the load receiver bodies 9 are arranged on the right and left sides of the second frame 33*b* of the cart body 2, the lower placing portion 5*a* is suspended by the right and left suspension portions 11, and the first detection devices 7*a* are close to each other and the second detection devices 7*b* are close to each other in the nested carts 1 and 1' on the right and left sides of the second frame 33*b* of the cart body 2 without the load receiver body 9 and the suspension portion 11 being located between the second frames 33*b* and 33*b* of the nested carts 1 and 1'. Therefore, nesting of the carts 1 and 1' is less likely to be affected.

In addition, since the first detection device 7*a* and the second detection device 7*b* arranged on the right and left sides of the second frame 33*b* of the cart body 2 are coupled by the connecting rod 8, pieces of detection information detected by the right and left sensors 10 mutually affect each other. Further, by complementing the pieces of detection information detected by the right and left sensors 10, respectively, it is possible to accurately detect commodities unevenly distributed in the right-left direction of the upper and lower placing portions 5*a* and 5*b*.

In addition, the connection portion 17 included in the support base 13 of the load receiver body 9 is fixed substantially at a center of the upper placing portion 5*b* in the front-rear direction, and the lower end 20*a* of the lower connection member 20 is fixed substantially at a center of the lower placing portion 5*a* in the front-rear direction. Therefore, it is possible to accurately detect commodities unevenly distributed in the front-rear direction of the upper and lower placing portions 5*a* and 5*b*.

In addition, the connection base 12 fixed to the front end 15*a* of the strain body 15 is fixed to the front end side of the second frame 33*b*. That is, since the load receiver body 9 having the connection base 12 is arranged near the front of the cart body 2, it is less likely to interfere with introduction of the commodity into the lower placing portion 5*a*.

Further, the side plate 17*a* of the connection portion 17 extends so that the upper plate 17*b*, which is the upper end of the connection portion 17, is positioned behind the fixed plate 16, and the lower part on the rear side of the side plate 17*a* is the inclined portion 17*c* (see FIG. 3) to ensure a space below the upper plate 17*b*. Further, the cover member 14 is positioned below the upper plate 17*b*, which is the upper end of the connection portion 17, and the cover member 14 of the following cart 1' enters on the rear side of the inclined portion 17*c* and below the upper plate 17*b* during nesting as illustrated in FIG. 5. In this way, by performing nesting so that parts of the detection devices 7 vertically overlap, the carts 1 and 1' may be nested close to each other while ensuring a sufficient length dimension of the strain body 15 to enable precise detection.

Even though the embodiments have been described above with reference to the drawings, the specific configuration is not limited to these embodiments, and any additions or modifications not depart from the scope of the invention are included in the invention.

For example, in the above embodiment, the description has been given on the premise that the cart is a cart 1 that can be nested in the front-rear direction and has the electronic device 6 used for commodity registration processing, payment processing, or registration processing and payment processing. However, the cart 1 does not necessarily have to include the electronic device 6, and may be, for example, a cart capable of detachably including the electronic device 6. In this case, the cart 1 preferably has a mounting member that can detachably provide the electronic device 6, a mobile terminal such as a smartphone, a tablet terminal, etc. to the cart body 2, a connection terminal for electrically connecting these terminals to the battery, etc.

Further, detection means capable of detecting the presence of the commodity placed on the upper and lower placing portions 5*a* and 5*b* in the detection device 7 is not limited to the load sensor using the strain gauge as in the above embodiment. For example, it is possible to adopt a photosensor, an infrared sensor, etc.

In addition, the two load receiver bodies 9 of the detection device 7 do not have to be arranged on the right and left sides of the cart body 2. For example, it is possible to adopt a configuration in which one load receiver body, that is, one sensor is arranged below the upper placing portion 5*b*.

Moreover, although the detection device 7 is arranged near the front of the cart body 2 in the above-described embodiment, an installation position of the cart body 2 in the front-rear direction is not limited thereto.

Further, the above embodiment illustrates a mode in which the cart body 2 of the cart 1 includes the lower body part 2*a* having a substantially bifurcated shape in a plan view and the plate-shaped upper body part 2*b* erected upward from the front portion of the lower body part 2*a*. However, the invention is not limited thereto, and the shape of the cart body 2 is not limited to the one described above, and various shapes may be adopted.

What is claimed is:

1. A shopping cart comprising:

a cart body;

an electronic device attached to the cart body and configured to perform at least one of registration processing and payment processing of commodities;

an upper placing portion provided in an upper stage of the cart body and having the commodities placed thereon;

a lower placing portion provided in a lower stage of the cart body and having the commodities placed thereon; and a detection device including a load sensor and configured to detect presence of the commodities placed on the upper placing portion and the lower placing portion, wherein the load sensor includes a strain body that has a first end and a second end opposed to each other in a longitudinal direction, the first end being connected to the cart body, and the second end being connected to a load receiver body fixed to a lower part of the upper placing portion, and the detection device further includes a suspension portion by which the lower placing portion is suspended from the load receiver body.

2. The shopping cart according to claim 1, wherein the load sensor further includes a strain gauge.

3. The shopping cart according to claim 1, wherein the longitudinal direction corresponds to a front-rear direction of the cart body, the first end corresponds to a front end of the strain body, and the second end corresponds to a rear end of the strain body.

4. The shopping cart according to claim 3, wherein the detection device includes the load receiver body on each of right and left sides of the cart body, and the lower placing portion is suspended by the suspension portion on each of the right and left sides.

5. The shopping cart according to claim 1, wherein the lower placing portion is arranged to open rearward with respect to the cart body.

6. The shopping cart according to claim 5, wherein the detection device includes the load receiver body on each of right and left sides of the cart body, and the lower placing portion is suspended by the suspension portion on each of the right and left sides.

7. The shopping cart according to claim 1, wherein the detection device includes the load receiver body on each of right and left sides of the cart body, and the lower placing portion is suspended by the suspension portion on each of the right and left sides.

* * * * *